Dec. 21, 1943.　　C. N. BEBINGER　　2,337,174
SHAKER CONVEYER DRIVE CONSTRUCTION
Filed Aug. 14, 1941　　2 Sheets-Sheet 1
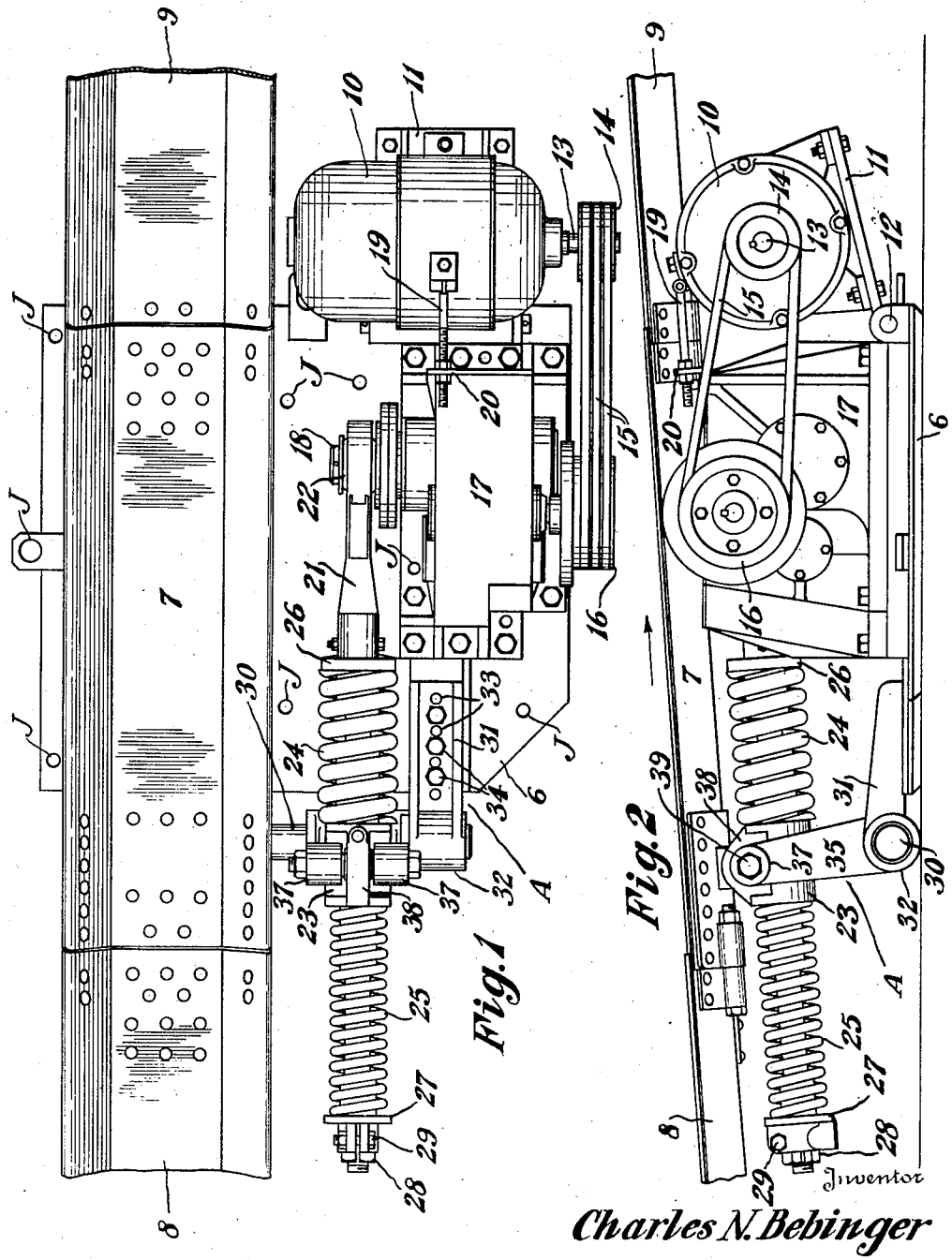
Inventor
Charles N. Bebinger
By Frease and Bishop
Attorneys Dec. 21, 1943.  C. N. BEBINGER  2,337,174
SHAKER CONVEYER DRIVE CONSTRUCTION
Filed Aug. 14, 1941  2 Sheets-Sheet 2
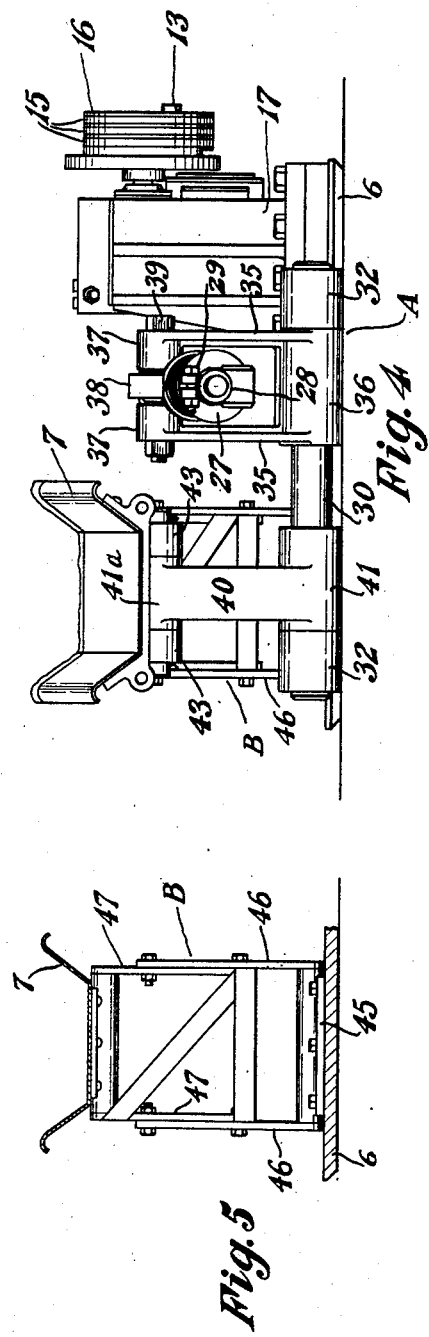
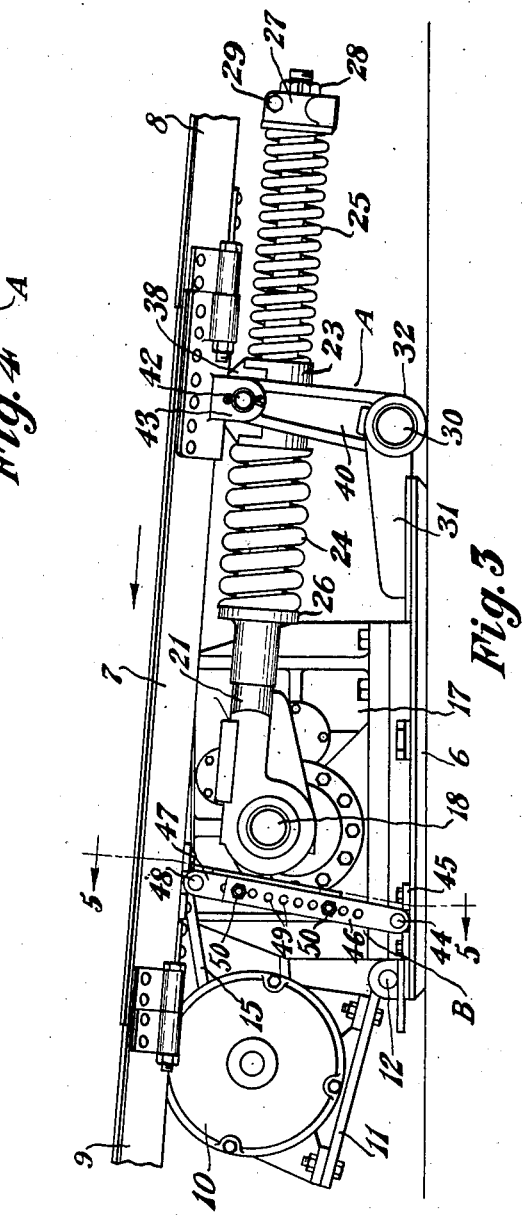
Inventor
*Charles N. Bebinger*
By *Frease and Bishop*
Attorneys Patented Dec. 21, 1943

2,337,174

UNITED STATES PATENT OFFICE 2,337,174

SHAKER CONVEYER DRIVE CONSTRUCTION

Charles N. Bebinger, New Philadelphia, Ohio, assignor to La-Del Conveyor & Manufacturing Company, New Philadelphia, Ohio, a corporation of Ohio Application August 14, 1941, Serial No. 406,850

4 Claims. (Cl. 198—220)

The invention relates generally to shaker conveyers having a differential stroke for conveying material, and more particularly to a spring drive for such conveyers especially as adapted for use in coal mines.

Shaker conveyers convey material by reason of a reciprocating movement which is slow and gradual during the forward stroke to advance the material, and which is relatively sudden and rapid during the rearward stroke to cause the conveyer to move backward while the material remains in its advanced position. The driving mechanism for imparting such differential reciprocating movement preferably includes springs of unequal strength for yieldingly imparting the differential stroke to the conveyer.

In certain prior constructions, the spring means is pivotally mounted on a driving crank which necessitates excessive height of the conveyer drive trough to take care of the vertical motion of the whole spring driving mechanism as the crank rotates, and this calls for a long drive trough to make the connection with the main conveyer. In coal mines these conditions present serious difficulties because the driving trough must be kept low due to lack of overhead clearance, and a short drive trough facilitates installation and handling. Moreover, mounting the spring driving mechanism on the driving crank imposes a heavy load on the crank, and the crank motion of the spring driving mechanism interferes with the conveying action of the drive trough.

In other prior constructions, the spring driving mechanism is mounted on a carriage which is supported on and hung from the driving trough, and such a construction is shown in my prior Patent No. 2,049,346, issued July 28, 1936, and entitled Spring drive for shaker conveyers. In such constructions the required carriage for the spring driving mechanism is heavy and elongated and must be rigidly connected to the drive trough at numerous places along its length, so that much labor and time is involved in connecting and disconnecting the driving mechanism to and from the drive trough during the required frequent repositioning of the drive in different places in a mine.

Moreover, in such drive constructions the spring driving mechanism is necessarily mounted underneath the drive trough where it is difficult of access for adjustment and repair, particularly since the drive trough is maintained at a low elevation close to the mine floor. Adjustment of the spring driving mechanism is made more difficult because the adjustment is made while in operation, and in many cases the drive trough is supported on a rocker arm to produce a tossing action for improving or accelerating the conveying action, which gives the spring drive mechanism an arcuate movement making the adjusting operation still more difficult.

In all prior constructions of which I am aware, the driving motor, reduction gearing and driving crank connected thereto are mounted on a base plate which is anchored in place by jacks spaced from the crank shaft and from the motor driving connections, with the result that shocks from the driving trough are transmitted to the crank shaft and through the driving connections to the motor, tending to distort the base plate and cause binding and misalignment of the bearings and driving connections between the motor and the reduction gearing.

It is therefore a general object of the present invention to provide an improved shaker conveyer drive construction which overcomes the disadvantages of prior drive constructions.

More specifically, it is an object of the present invention to provide an improved shaker conveyer drive construction which embodies a short drive trough maintained at a minimum height.

Another object is to provide an improved drive construction which does not impose excessive load on the driving crank.

Another object is to provide an improved construction in which the entire driving mechanism may be quickly and easily disconnected from the drive trough and moved from place to place as an integral unit.

A further object is to provide an improved shaker drive construction in which the driving mechanism is adapted to be located at one side of the driving trough where it is readily accessible for adjustment and repair.

Another object is to provide an improved driving construction to which the reciprocating motion of the driving mechanism is such as to produce maximum conveying efficiency and to permit adjustment thereof during operation with the utmost ease and convenience.

Another object is to provide an improved drive construction in which the motor and driving connections therewith are relieved from the shock transmitted from the driving trough.

A further object is to provide an improved shaker drive unit including a rocker carriage for accomplishing three separate purposes, namely, supporting the spring driving mechanism, connecting the spring driving mechanism to the drive trough, and accelerating the forward speed of the material being conveyed.

A still further object is to provide an improved shaker drive unit having a rocker carriage for supporting the spring driving mechanism and connecting the same to the drive trough, said rocker carriage being adjustable to increase or decrease the speed of the material being conveyed to meet varying requirements.

These and other objects are accomplished by the parts, improvements, arrangements, combinations and sub-combinations comprising the present invention, which is hereinafter described in detail in connection with the accompanying drawings and defined in the appended claims.

In general terms the present invention includes a shaker drive unit including a motor, gear reducer, crank and rocker carriage mounted on a single base plate, with the motor positioned at the opposite end of the base plate from the spring driving mechanism, said rocker carriage supporting the spring driving mechanism and being connected directly to the drive trough, and said drive unit with the spring driving mechanism being located preferably at one sde of the drive trough.

Referring to the drawings forming part hereof, in which a preferred embodiment of the invention is shown by way of example Figure 1 is a plan view of the improved shaker conveyer drive with fragments of the conveyer troughing shown attached to the forward and rear ends of the drive trough;

Fig. 2 is a side elevation thereof looking at the side on which the motor is located;

Fig. 3 is a side elevation thereof looking at the side opposite the motor;

Fig. 4 is an end elevation thereof; and

Fig. 5 is a fragmentary transverse sectional view as on line 5—5, Fig. 3.

Similar numerals refer to similar parts throughout the drawings.

The improved shaker conveyer drive construction preferably includes a base plate 6 which extends under the conveyer drive trough 7, and the trough is inclined upwardly towards its forward or discharging end, the movement of material on the trough being in the direction of the arrow in Fig. 2. A section of conveyer troughing shown fragmentarily at 8 is connected to the rear end of the conveyer drive trough, and another section of conveyer troughing shown fragmentarily at 9 is connected to the forward end of the drive trough.

The power for reciprocating the conveyer is preferably supplied by an electric motor 10 which is mounted at one end of the base plate 6, being shown preferably at the forward end of the base plate. The base 11 of the motor 10 is pivotally mounted as at 12 on the forward end of the base plate, so that shocks received by the base plate are cushioned by the motor mounting to relieve the motor from said shocks.

The motor shaft 13 has a multiple pulley 14 secured thereon and V belts 15 operatively connect the pulley 14 with a driven multiple pulley 16 operatively connected with reduction gearing in a gear case 17, and the reduction gearing drives a crank 18 extending from the opposite side of the gear case.

The belt drive between the motor and the gear case permits locating the motor at the forward end of the gear case with its axis at right angles to the conveyer trough line and enables jacks for anchoring the base plate to be located closely adjacent to the crank side of the gear case where shocks are transmitted. Thus the motor is removed from the region of shock and the belt drive provides a flexible connection between the motor and gear case so that shocks are not transmitted to the motor through the driving connections.

Means for swinging the motor slightly about the pivot 12 to adjust the tension on the belts 15 may include a tie rod 19 connected to the top of the motor and adjustably connected at its other end to a flange 20 on the gear case.

Means for operatively connecting the driving crank 18 to the spring driving mechanism preferably includes a puller rod 21 universally journaled on the crank by means of a spherical bearing indicated at 22. A crosshead 23 is slidably mounted on the puller rod 21 and a relatively strong coil spring 24 encircles the puller rod and engages the forward side of the crosshead while a relatively weak coil spring 25 encircles the puller rod and engages the rearward side of the crosshead. The puller rod is provided with a thrust flange 26 for abutting the forward end of the strong spring 24, and is provided at its outer end with a split thrust member 27 for abutting the rearward end of the weak spring 25. An adjusting nut 28 is provided on the end of the puller rod for adjusting the compression on the springs 24 and 25, and a clamping bolt 29 clamps the thrust member 27 on the puller rod.

The construction and action of the spring driving mechanism is according to usual practice, and per se forms no part of the present invention.

The improved means for supporting the spring driving mechanism preferably includes a rocker carriage A having a rocker shaft 30 extending at right angles to the conveyer and under the same and supported on the rear end of the base plate 6 by means of bracket arms 31 having bearings 32 in which the rocker shaft 30 is journaled. One of the bracket arms 31 is secured to the base plate 6 adjacent to the gear box 17 at the rear end thereof opposite to the motor, and the other bracket arm 31 is secured to the base plate 6 at the rear end thereof and under the conveyor drive trough 7. As shown in Fig. 1 these bearing arms 31 are provided with a series of bolt holes 33 so that the bolts 34 may be inserted in different holes in the bracket arms to adjust the same longitudinally on the base plate.

Means for pivotally supporting the spring driving mechanism on the rocker shaft 30 preferably includes two upright rocker arms 35 connected at their lower ends to a sleeve 36 keyed on the rocker shaft 30, and extending upwardly on opposite sides of the crosshead 23. The arms 35 are provided at their upper ends with bosses 37, and an ear 38 projects upwardly from the crosshead 23 between the bosses 37. The ear 38 is pivotally connected to the arms 35 by means of a bolt 39 extending through the bosses and journaled in the ear 38 of the crosshead.

Accordingly, the crosshead 23 and therefore the entire spring driving mechanism is pivotally supported on the rocker shaft 30 of the rocker carriage, so that no excessive load is imposed on the crank 18.

Means for supporting the conveyor drive trough 7 directly on the rocker carriage A preferably includes an upright supporting arm 40 located under the drive trough and having a sleeve 41 at its lower end keyed on the rocker shaft 30. The upper end of support arm 40 is provided with a bearing portion 41a which is journaled on a pin 42, and at each side of the bearing portion 41a the pin 42 is journaled in ears 43 which are secured to the joint plate of the drive trough 7 at the rear end of the drive trough.

The forward end portion of the drive trough 7 is preferably supported on another rocker carriage B which is pivotally mounted on the base plate. This rocker carriage includes a rocker shaft 44 journaled in a bracket 45 secured on the base plate 6, and having upright arms 46 secured to its ends. The upright arms 46 are adjustably connected to the side arms 47 of a rocker frame, and the arms 47 are journaled at their upper ends on a shaft 48 which is secured to the under side of the drive trough. The arms 46 and 47 are provided with series of bolt holes 49 adapted to register with each other in various vertical positions for receiving the bolts 50, so that the height of the arms 47 of the rocker frame can be quickly and easily adjusted to adjust the height of the forward end of the drive trough and accordingly adjust the inclination of the drive trough.

In operating the conveyer drive it is customary to initially adjust the thrust member 27 by loosening the clamping bolt 29 and adjusting the nut 28 to place the springs 24 and 25 under compression in order to obtain the most effective conveying stroke for a given conveyer load. As the crank 18 moves to the right in viewing Fig. 3, the relatively strong compression spring 24 is compressed transmitting the stroke through the crosshead 23 to give the conveyer drive trough 7 a relatively sudden and rapid rearward stroke causing it to slide under the material on the conveyer. As the crank moves to the left on the rearward stroke, the relatively weak compression spring 25 is compressed and moves the crosshead forwardly with a relatively slow and gradual stroke to convey material forwardly in the direction of the arrow. Thus the springs 24 and 25 act to yieldingly impart a differential stroke to the conveyer drive trough, in accordance with the customary action of shaker conveyers.

As the conveyer reciprocates, the crosshead 23 travels in an arc about the rocker shaft 30 as a center and this arcuate movement imparts a tossing action to the conveyer which acts to improve the conveying action by accelerating the flow of the material over the conveyer trough. The other rocker carriage B pivoted at 44 on the base plate controls the movement of the forward end of the drive trough and causes it to move in an arcuate path about the center of the pivot 44. The two rocker carriages thus maintain the desired angle or inclination of the drive trough while it is reciprocating in an arcuate path.

The fact that the crosshead 23 is supported on arms 35 equal in length to the arm 40 supporting the drive trough, with both the arms 35 and 40 keyed on the rocker shaft 30, causes the application of force from the crosshead to the trough line at all times to be in the same plane in which the trough is moved. This not only produces ideal conveying motion, but provides the utmost ease and convenience in adjusting the nut 28 while the conveyer is in operation, because the nut has a minimum of vertical movement.

The particular novel arrangement of the motor, gear case and spring driving mechanism all at one side of the conveyer trough, with the motor at one end of the gear case and the spring driving mechanism at the other end, all supported on a single base plate, provides maximum accessibility to all of the driving parts for repair and adjustment; and in addition makes a compact arrangement which removes the motor and driving connections from the shock region and enables the location of jacks at or near the crank shaft and gear case to rigidly support the base plate and prevent distortion thereof. In Fig. 1 a desirable arrangement of jack locations is indicated by the circles J on the base plate.

This compact arrangement of the entire drive on a single base plate adapts the drive for being quickly disconnected as a unit from the drive trough without disassembling any of the driving mechanism except to remove the single pin 42 which pivotally connects the support arms 35 of the carriage to the drive trough.

The adjustable mounting of the rocker carriage A on the base plate 6 by means of the bolts 34 and the series of bolt holes 33 makes it possible to add to or detract from the tossing action imparted to the conveyer trough line by reason of its arcuate movement, so as to increase or decrease the speed of the material being conveyed to comply with varying requirements.

I claim:

1. Shaker conveyer drive construction including a base plate, a crank and means for driving the same mounted on said base plate, spring driving mechanism operatively connected to said crank, a rocker carriage pivotally mounted on said base plate and oscillatably supporting said spring driving mechanism, and a conveyer drive trough located at one side of said spring driving mechanism and directly connected to said rocker carriage.

2. Shaker conveyer drive construction including a base plate, a crank and means for driving the same mounted on said base plate, spring driving mechanism operatively connected to said crank, a rocker carriage pivotally mounted on said base plate and oscillatably supporting said spring driving mechanism, and a conveyer drive trough located at one side of said spring driving mechanism and having a single pin connection with said rocker carriage.

3. Shaker conveyer drive construction including a base plate, a crank and means for driving the same mounted on said base plate, spring driving mechanism including unequal strength springs with a crosshead therebetween, a puller rod operatively connecting said crank with said spring driving mechanism for yieldingly reciprocating said crosshead, a rocker carriage mounted on said base plate and pivotally supporting said crosshead, and a conveyer drive trough supported directly on said carriage.

4. Shaker conveyer drive construction including a base plate, a crank and means for driving the same mounted on said base plate, spring driving mechanism including unequal strength springs with a crosshead therebetween, a puller rod operatively connecting said crank with said spring driving mechanism for yieldingly reciprocating said crosshead, a rocker carriage mounted on said base plate and pivotally supporting said crosshead, and a conveyer drive trough located at one side of the spring driving mechanism and supported directly on said carriage.

CHARLES N. BEBINGER.